(12) United States Patent
Uzawa

(10) Patent No.: US 7,808,725 B2
(45) Date of Patent: Oct. 5, 2010

(54) TAKING OPTICAL SYSTEM

(75) Inventor: Tsutomu Uzawa, Shibuya-ku (JP)

(73) Assignee: Olympus Medical Systems Corp., Tokyo (JP)

( * ) Notice: Subject to any disclaimer, the term of this patent is extended or adjusted under 35 U.S.C. 154(b) by 0 days.

(21) Appl. No.: 12/288,467

(22) Filed: Oct. 20, 2008

(65) Prior Publication Data

US 2009/0102961 A1    Apr. 23, 2009

(30) Foreign Application Priority Data

Oct. 23, 2007   (JP) .............................. 2007-274879

(51) Int. Cl.
*G02B 15/14*    (2006.01)
*G02B 9/04*    (2006.01)

(52) U.S. Cl. ...................... 359/795; 359/692

(58) Field of Classification Search ......... 359/676–679, 359/683–692, 754–758, 763–766, 771–778, 359/784–790, 793, 795

See application file for complete search history.

(56) References Cited

U.S. PATENT DOCUMENTS 4,898,457 A    2/1990   Alexeev et al.

5,596,453 A *  1/1997   Kim ........................... 359/692
2005/0068634 A1* 3/2005  Miyatake et al. ............ 359/676

FOREIGN PATENT DOCUMENTS

| JP | 06-018328 | 1/1994 |
|---|---|---|
| JP | 2005-099080 | 4/2005 |
| JP | 2006-053218 | 2/2006 |

\* cited by examiner

*Primary Examiner*—Darryl J Collins
(74) *Attorney, Agent, or Firm*—Kenyon & Kenyon LLP

(57) ABSTRACT

The invention relates to an eyepiece-connected taking optical system well fit for TV camera heads using a small-format imaging device. The taking optical system comprises a field direction turning member 1P, 2P, a positive first group and a negative second group. The first group comprises a positive cemented lens convex on its object side, a positive single lens convex on its object side and a positive cemented lens convex on its object side, and the second group comprises a negative single lens. Focus adjustment is implemented by changing a spacing t2 between the first group and the second group. The taking optical system satisfies condition (1) for defining the position of the front focus with respect to the taking lens, condition (2) for defining the refracting power of each lens group, condition (3) for defining the imaging magnification of the second group, and condition (4) for defining the profile of refracting power in the first group.

4 Claims, 10 Drawing Sheets

Example 1

Example 2

Example 3

Example 4

Example 4 (Deformation)

TAKING OPTICAL SYSTEM

BACKGROUND OF THE INVENTION

The present invention relates generally to a taking optical system adapted to be connected to an eyepiece of a viewing optical system for taking images, and more particularly to a taking optical system adapted to be connected to an eyepiece of an endoscope to take images on TV cameras.

With an endoscope having an eyepiece lens such as a hard endoscope, and a fiber scope, a detachable endoscope TV camera is positioned in the rear of the eyepiece lens to guide images in the body cavity, obtained through the endoscope, to an imaging portion for viewing on TV.

For instance, referring to a TV camera for the urinary organs, a camera head 5 having a taking lens 7 is mounted in the rear of an eyepiece lens 4 of a hard endoscope 1, as shown typically in FIG. 1, so that images in the body cavity can be viewed on a TV monitor 9 via that camera head 5. Note here that the hard endoscope 1 has an objective lens 2, a relay lens 3, etc. inside, and the camera head 5 has a field direction turning prism 6, a taking lens 7, a CCD or other imaging device 8, etc. inside. More specific construction of the camera head is shown typically in Patent Publication 1.

So far, a typical imaging device used with a TV camera has been designed such that the best shading performance is obtainable when off-axis chief rays are vertically incident on an imaging plane. An endoscope in general, and a hard endoscope used for surgical operations or the like in particular, has often an exit pupil position of the eyepiece lens 4 jutting about 10 mm from an eyepiece in consideration of convenience of visual observation. In a conventional endoscope TV camera, therefore, the exit pupil of an endoscope eyepiece optical system is in alignment with the front focus position of a taking lens to form a taking optical system telecentric on the image side, whereby off-axis chief rays are vertically incident on the imaging plane.

In recent years, the environment surrounding imaging devices has been as mentioned below.

First, they grow smaller and smaller.

Second, there are specifications with which the shading performance for the angle of incidence of rays is optimized.

Referring here to the first consideration, a typical prior art is the following (A), and a more recently developed imaging device is the following (B):

(A) an imaging device designed such that when off-axis chief rays are vertically incident on an imaging plane (when the exit pupil position of a taking lens is at infinity with respect to the imaging plane), the best shading performance is achievable: this will hereinafter be called the imaging device optimized for vertical incidence (FIG. 11(a)), and (B) an imaging device designed such that when off-axis chief rays are incident on the imaging plane at an angle of divergence (when the exit pupil position of a taking lens is on the object side with respect to the imaging plane), the best shading performance is achievable: this will hereinafter be called the imaging device optimized for oblique incidence (FIG. 11(b)).

TV camera heads are preferably small in size and light in weight so as to be not a burden on the operation of endoscopes. To this end it is preferable to use a small-format imaging device in view of mechanical design. However, there are the following problems 1 and 2 involved in the mechanical design:

(1) For a camera head using a small-format imaging device, it is required to make the focal length of a taking optical system short depending on the size of the imaging device. However, because the exit pupil position of an eyepiece lens and the spacing between the eyepiece lens and the taking optical system remain invariable, the exit pupil position of the taking lens is going to lie on the image side with respect to an image side (to have a plus value). In this case, off-axis chief rays are at an angle of convergence with respect to the imaging plane (FIG. 12). The matching of the exit pupil of the taking lens and the shading performance of the imaging device goes worse with the result that there is shading. Shading is a problem with both (A) and (B), and that problem gets graver with the imaging device (B) optimized for oblique incidence in particular.

It is here understood that while reference has been made to the TV camera head using a field direction turning member, similar problems also arise when the exit pupil position of the eyepiece lens cannot be proximate to the taking lens of the camera head, as (a) in the case where the exit pupil position juts less (less than 10 mm) from the eyepiece, and (b) in the case where members such as a filter and a stop are interposed between the eyepiece lens and the camera head.

(2) As the focal length of the lens becomes short, the back focus of the lens becomes short. As a result, when focus adjustment is implemented by changing the spacing between the taking lens and the imaging device, interference is likely, or it is difficult to provide a sufficient focus range.

Apart from the aforesaid prior art TV camera head, there are such arts as set forth typically in the following patent publications.

[Patent Publication 1]
Utility Model 6-18328
[Patent Publication 2]
JP(A) 2005-99080
[Patent Publication 3]
JP(A) 2006-53218
[Patent Publication 4]
U.S. Pat. No. 4,898,457

The camera head of Patent Publication 2 is to make correction of various aberrations and make sure a back focus in the case of using a small-format imaging device. However, this camera head is of the type wherein the optical axis of an eyepiece lens is in line with that of a taking optical system, and so any prism for turning field directions cannot be located. This publication says nothing specific about the exit pupil of the taking lens and the shading performance of the imaging device.

The camera head of Patent Publication 3 is to improve on the shading performance in view of the exit pupil of a taking lens. However, the camera head is optimized for the aforesaid prior art type (A); it is of the type wherein the optical axis of an eyepiece lens is in line with that of a taking optical system, and so any prism for turning field directions cannot be located.

Patent Publication 4 describes a TV camera lens for a television tube, wherein a field lens fit for each construction of taking lens is located just in front of the television tube. However, this is directed to a TV camera for general shooting, not a camera head connected to an eyepiece lens for use.

SUMMARY OF THE INVENTION

In view of such problems with the prior art as described above, an object of the invention is to provide an eyepiece-connected taking optical system well fit for TV camera heads using a small-format imaging device.

According to one aspect of the invention, the aforesaid object is accomplishable by the provision of a taking optical system comprising, in order from its object side, a positive first group and a negative second group, characterized in that focus adjustment is implemented by changing the spacing between the first group and the second group, with the satisfaction of the following condition (1):

$$1.4 < L/f < 2 \quad (1)$$

where L is the absolute value of the distance of the first group from the lens surface nearest to the object side to a front focus, and f is the focal length of the whole taking optical system.

To locate the exit pupil of the taking lens on the object side (the minus side) with respect to an imaging plane, the front principal point of the taking lens must be as close to the object side as possible. It is then preferable to have a so-called telephoto type arrangement wherein a lens group having positive refracting power is located on its object side and a lens group having negative refracting power is disposed on its image side. Besides, by the satisfaction of condition (1), the exit pupil of the taking lens is positioned on the object side with respect to the imaging plane. However, the telephoto type is not fit for making sure a back focus. As the whole taking lens is moved in an optical axis direction for the purpose of focus adjustment, it ends up with interference with the imaging device. To avoid this, the taking lens of the invention is designed such that focus adjustment is implemented by changing the spacing between the first group and the second group.

With an arrangement such as the one contemplated here, it is possible to set the exit pupil position on the object side with respect to the imaging plane, and implement focus adjustment as well.

Condition (1) is to define the position of the front focus with respect to the taking lens. As the lower limit of 1.4 to condition (1) is not reached, it is impossible to locate the exit pupil on the object side with respect to the imaging plane. As the upper limit of 2 to condition (1) is exceeded, on the other hand, it may work for setting the exit pupil position, but it causes the refracting power of each lens group to grow too strong for correction of aberrations.

Note here that focus adjustment may be implemented by the movement of the first group in the optical axis direction or the movement of the second group in unison with the imaging device.

More preferably in this case, the following conditions (2), (3) and (4) should be satisfied.

$$-1.3 < f_1/f_2 < -0.7 \quad (2)$$

$$1.05 < \beta_2 < 1.4 \quad (3)$$

$$0.2 < f_{1F}/f_{1R} < 1.6 \quad (4)$$

where $f_1$ is the focal length of the first group, $f_2$ is the focal length of the second group, $\beta_2$ is the imaging magnification of the second group, $f_{1F}$ is the focal length of the lens located in the first group and nearest to the object side, and $f_{1R}$ is the focal length of the lens located in the first group and nearest to the image side.

It is thus more preferable to satisfy condition (1) plus conditions (2), (3) and (4).

Condition (2) is to define the refracting power of each lens group. Exceeding the upper limit of −0.7 to condition (2) works against locating the exit pupil on the object side with respect to the imaging plane. On the other hand, falling short of the lower limit of −1.3 to condition (2) may work for setting the exit pupil position, but works against correction of aberrations.

Condition (3) is to define the imaging magnification of the second group. As the lower limit of 1.05 to condition (3) is not reached, it works against locating the exit pupil on the object side with respect to the imaging plane. It also renders the second group likely to interfere with the imaging device. As the upper limit of 1.4 to condition (3) is exceeded, on the other hand, it may work for setting the exit pupil position, but works against correction of aberrations.

Condition (4) is to define the profile of refracting power in the first group. The dispersion of positive refracting power within the first group is preferable for correction of aberrations. Falling short of the lower limit of 0.2 to condition (4) may work for setting the exit pupil position, but works against correction of aberrations. On the other hand, exceeding the upper limit of 1.6 to condition (4) does not offer any problem with correction of aberrations, but works against locating the exit pupil on the object side with respect to the imaging plane.

According to another aspect of the invention, there is a taking optical system provided, which comprises, in order from its object side, a field direction turning member, a positive first group and a negative second group, characterized in that said first group comprises a positive cemented lens convex on its object side, a positive single lens convex on its object side and a positive cemented lens convex on its object side, said second group comprises a negative single lens, and focus adjustment is implemented by changing the spacing between said first group and said second group, with the satisfaction of the following conditions (1), (2), (3) and (4):

$$1.4 < L/f < 2 \quad (1)$$

$$-1.3 < f_1/f_2 < -0.7 \quad (2)$$

$$1.05 < \beta_2 < 1.4 \quad (3)$$

$$0.2 < f_{1F}/f_{1R} < 1.6 \quad (4)$$

where L is the absolute value of the distance of the first group from the lens surface nearest to the object side to the front focus, f is the focal length of the whole taking optical system, $f_1$ is the focal length of the first group, $f_2$ is the focal length of the second group, $\beta_2$ is the imaging magnification of the second group, $f_{1F}$ is the focal length of the lens located in the first group and nearest to the object side, and $f_{1R}$ is the focal length of the lens located in the first group and nearest to the image side.

To have an arrangement that is more simplified while satisfying the conditions for the exit pupil and making sure correction of aberrations, there is the need of achieving a proper lens arrangement.

Requirements for the first group are:

(A) Positive refracting power is dispersed throughout three lens elements (provided that a cemented lens is counted as one) to allow one each to have positive refracting power. The dispersion of positive refracting power reduces aberrations occurring at each lens element.

(B) The three lens elements are each convex on its object side surface, working for locating the front principal point position on the object side.

(C) Longitudinal chromatic aberration is corrected mainly at the cemented lens nearest to the object side, and chromatic aberration of magnification is corrected at the cemented lens nearest to the image side.

As described above, the first group may be made up of three lens elements.

Having a main role of setting the exit pupil, the second group may be made up of a negative single lens.

It is then preferable to satisfy conditions (1), (2), (3) and (4) as defined above.

According to yet another aspect of the invention, there is a taking optical system provided, which comprises, in order from its object side, a field direction turning member, a positive first group and a negative second group, characterized in that said first group comprises a first positive cemented lens convex on its object side, and a second positive cemented lens convex on its object side, said second group comprises a negative single lens, and focus adjustment is implemented by changing the spacing between said first group and said second group, with the satisfaction of the following conditions (1), (2), (3) and (4):

$$1.4 < L/f < 2 \tag{1}$$

$$-1.3 < f_1/f_2 < -0.7 \tag{2}$$

$$1.05 < \beta_2 < 1.4 \tag{3}$$

$$0.2 < f_{1F}/f_{1R} < 1.6 \tag{4}$$

where L is the absolute value of the distance of the first group from the lens surface nearest to the object side to the front focus, f is the focal length of the whole taking optical system, $f_1$ is the focal length of the first group, $f_2$ is the focal length of the second group, $\beta_2$ is the imaging magnification of the second group, $f_{1F}$ is the focal length of the lens located in the first group and located nearest to the object side, and $f_{1R}$ is the focal length of the lens located in the first group and nearest to the image side.

The arrangement may be further simplified in the following manner.

When preference is given to simplification, it should be better to construct the first group from two cemented lenses.

(A') Positive refracting power is shared by two lens elements (provided that a cemented lens is counted as one).

(B') The two lens elements are each convex on its object side surface, working for locating the front principal point position on the object side.

(C') Longitudinal chromatic aberration is corrected mainly at the cemented lens nearest to the object side, and chromatic aberration of magnification is corrected at the cemented lens nearest to the image side.

As described above, the first group may be made up of two lens elements.

Having a main role of setting the exit pupil, the second group may be made up of a negative single lens.

It is then preferable to satisfy conditions (1), (2), (3) and (4) as defined above.

Throughout the aforesaid aspects of the invention, the negative single lens in the second group is joined to the imaging device, and it is preferable that during assembling, the first group and the second group are adjusted for decentration.

It is preferable that focus adjustment is implemented by changing the spacing between the first group and the second group, and when the spacing between the second group and the imaging device is not used for focus adjustment, the second group is positioned as close to the imaging device as possible in view of locating the exit pupil of the taking lens. It should be better to provide no air space between the second group and the imaging device, because dust near the imaging plane is apt to be taken in a part of image. Joining the second group to the imaging device enables the second group to be proximate to the imaging device, and because of the absence of an air space in which dust may possibly be entered, dust is less likely to be taken in the ensuing image.

During assembling, the second group joined to the imaging device and the first group are adjusted for decentration so that there is a decrease in the deterioration of aberrations due to fabrication errors. Note that the "adjustment for decentration" here refers to the vertical movement of the lens groups while the optical axis of the first group is in alignment with that of the second group.

It is understood that for the field direction turning member, any desired member other than those described in the following examples (for instance, see FIG. 6) as well as mirrors may be used. The number of reflections may be not just an even number but also an odd number. In the case of odd-numbered reflections, signals of the imaging device may just as well be read in mirror image form.

The invention may be applied not just to TV camera heads using a field direction turning member but also to other eyepiece-connected cameras wherein the exit pupil position of an eyepiece lens cannot be proximate to the taking lens of the camera head.

According to the invention, it is possible to provide an eyepiece-connected taking optical system well fit for TV camera heads using a small-format imaging device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

An account is now given of Numerical Examples 1, 2, 3 and 4 of the eyepiece-connected taking optical system of the invention. Lens data about each numerical example will be given later.

Figure 2:
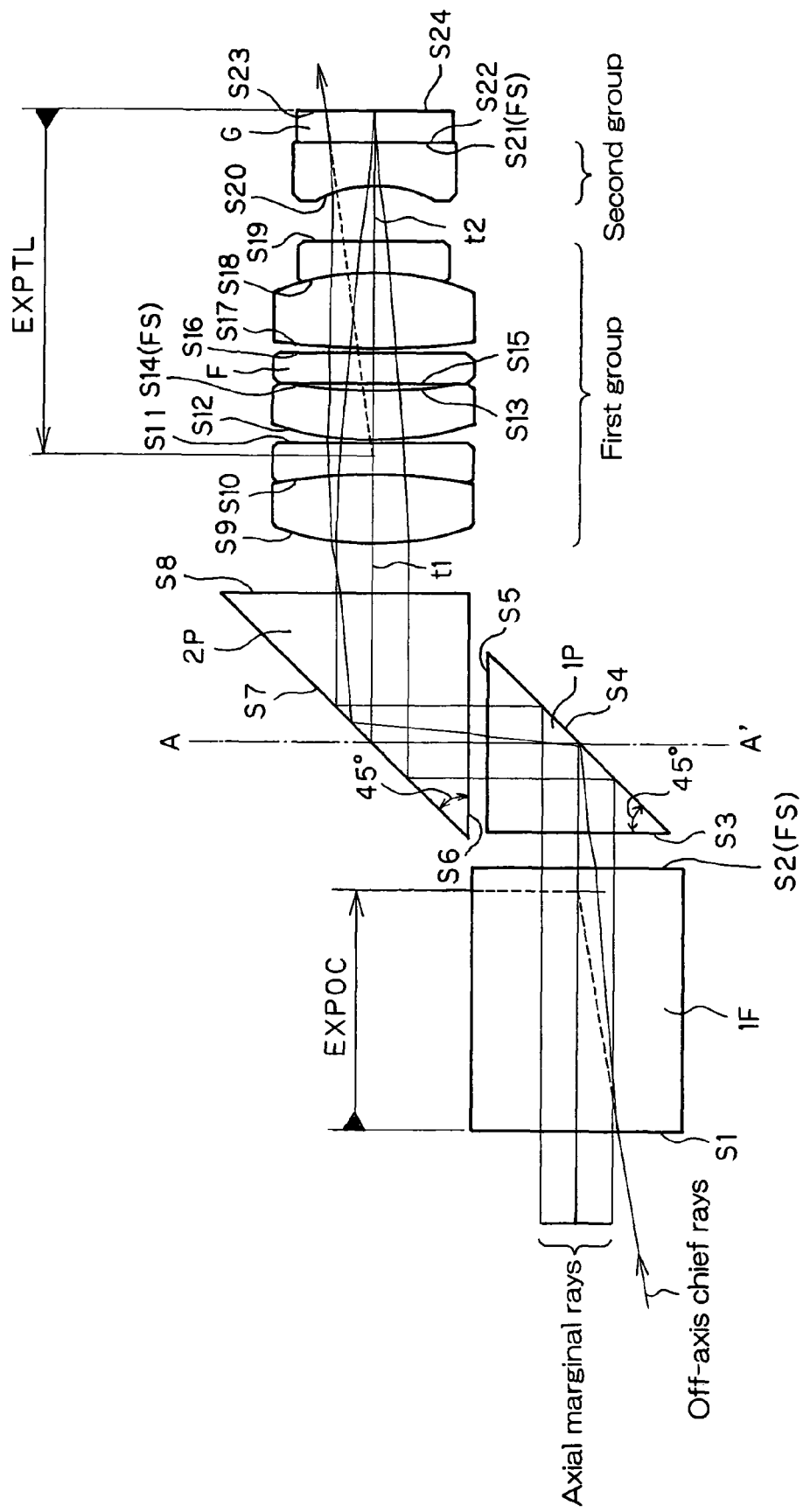
FIG. 2 is illustrative in lens arrangement section of the taking optical system of inventive Example 1.

FIG. 2 is illustrative in lens arrangement section of the taking optical system of Example 1 including its optical axis. S1 to S24 are surface Nos. as counted from the object side (S24 is indicative of the imaging plane). In FIG. 2, reference numeral 1F stands for a cover glass for a camera head; 1P the first prism that is the field direction turning prism; 2P the second prism that is the field direction turning prism; F an infrared cut filter; G a CCD chip sealing glass; FS a flare stop; t1 a focus adjustment spacing; t2 a focus adjustment spacing; EXPOC the exit pupil position of the eyepiece lens; and EXPTL the exit pupil position of the taking lens. Throughout Examples 2, 3 and 4, the same shall apply, too.

Figure 1:
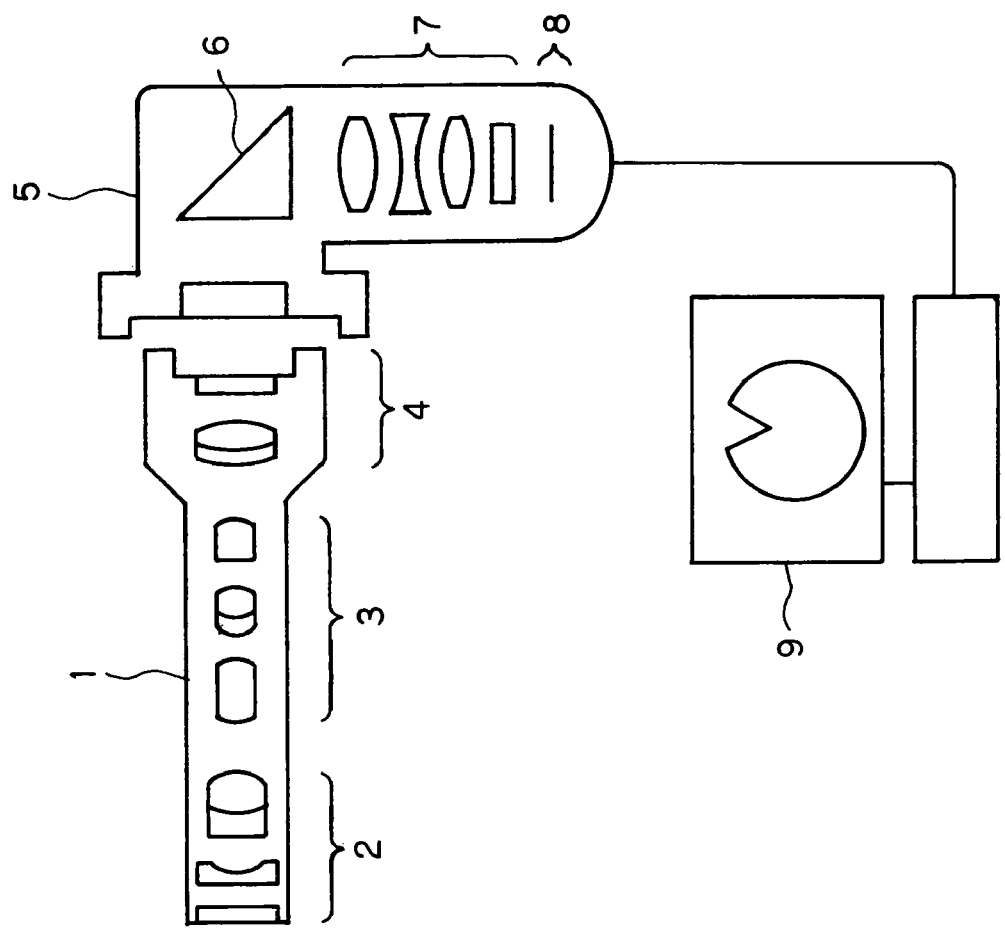
FIG. 1 is illustrative of one exemplary construction of a hard endoscope to which the taking optical system of the invention is applicable.

The taking optical system (camera head) here is built up of, in order from the eyepiece lens side of a hard endoscope 1 shown typically in FIG. 1, on which the taking optical system is mounted, the camera head's cover glass 1F indicated by surface Nos. S1 and S2, the first prism 1P that is the field direction turning prism indicated by surface Nos. S3 to S5, the second prism 2P indicated by surface Nos. S6 to S8, the first group of the taking lens indicated by surface Nos. S9 to S19, the second group indicated by surface Nos. S20 and S21, the CCD chip sealing glass G indicated by surface Nos. S22 and S23, and the imaging plane indicated by surface No. S24. The first prism 1P is made up of a right-angle prism having a reflecting surface S4 at an angle of 45° with an entrance surface S3, and the second prism 2P, too, is made up of a right-angle prism having a reflecting surface S7 at an angle of 45° with an entrance surface S6. The first group of the taking lens is made up of a positive cemented lens of a double-convex positive lens indicated by surface Nos. S9 and S10 and a concave-plano negative lens indicated by surface Nos. S10 and S11, a positive meniscus lens convex on its object side and indicated by surface Nos. S12 and S13, the flare stop FS indicated by surface No. S14, the infrared cut filter F indicated by surface Nos. S15 and S16, and a positive cemented lens of a double-convex positive lens indicated by surface Nos. S17 and S18 and a concave-plano negative lens indicated by surface Nos. S18 and S19, and the second lens group of the taking lens is made up of a concave-plano negative lens indicated by surface Nos. S20 and S21. The second lens group of the taking lens, the CCD chip sealing glass G and the imaging plane are bonded together (in the lens data given later, a vitreous material between the second group and the CCD chip sealing glass G, and a vitreous material between the CCD chip sealing glass G and the imaging plane is a bonding agent). Note here that the second surface (S2) of the camera head's cover glass 1F and the second surface (S21) of the concave-plano negative lens in the second group also serve as the flare stop FS.

To turn the field direction such that the axis of light incident from the eyepiece lens side on the taking optical system makes an angle of 90° with the axis of light incident on the imaging plane, the optical system after the second prism 2P is rotated together 90° from the shown position about an axis indicated by A-A' and lying on an optical axis from the reflecting surface S4 of the first prism 1P to the reflecting surface S7 of the second prism 2P.

The variable spacing for focus adjustment is defined by the air space t1 between the second prism 2P and the first group, and the air space t2 between the first group and the second group. As the object distance grows short, the first group is let out toward the object side while as the object distance becomes negative, the first group is conversely let out toward the image side.

Figure 11:
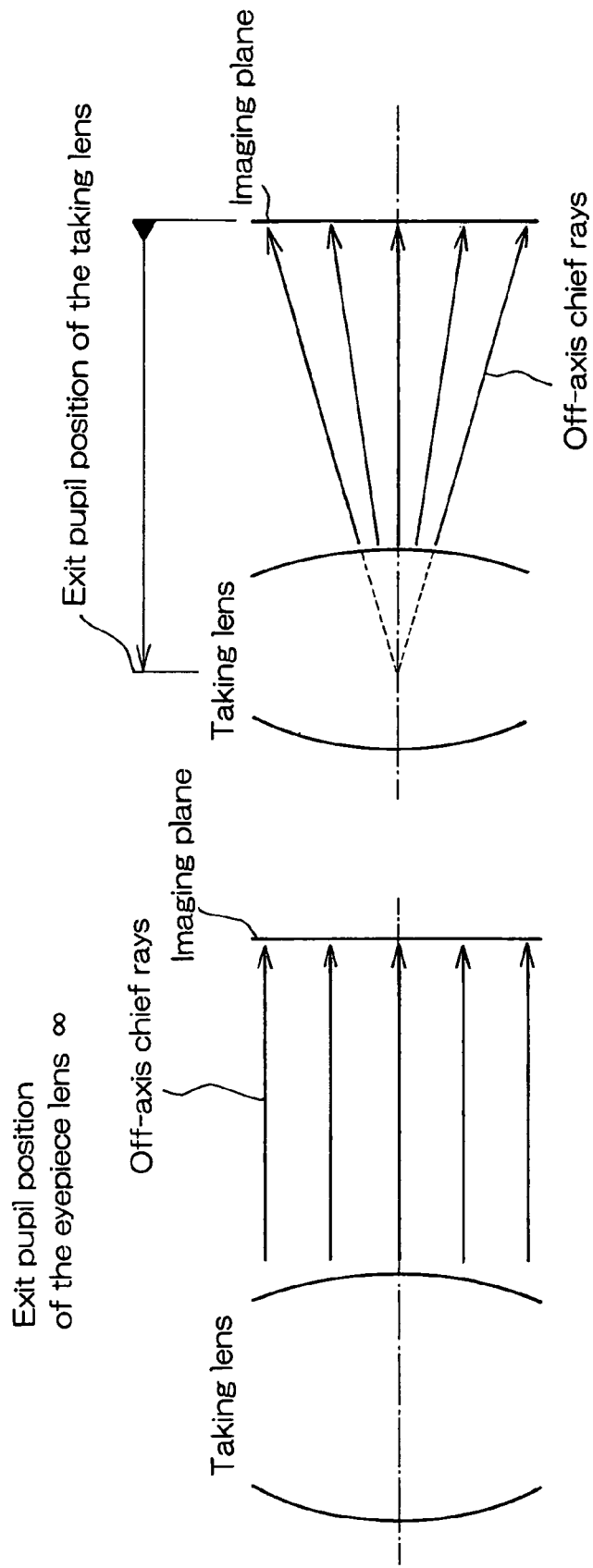
FIG. 11 is illustrative of (a) the imaging device optimized for vertical incidence and (b) the imaging device optimized for oblique incidence.
Figure 12:
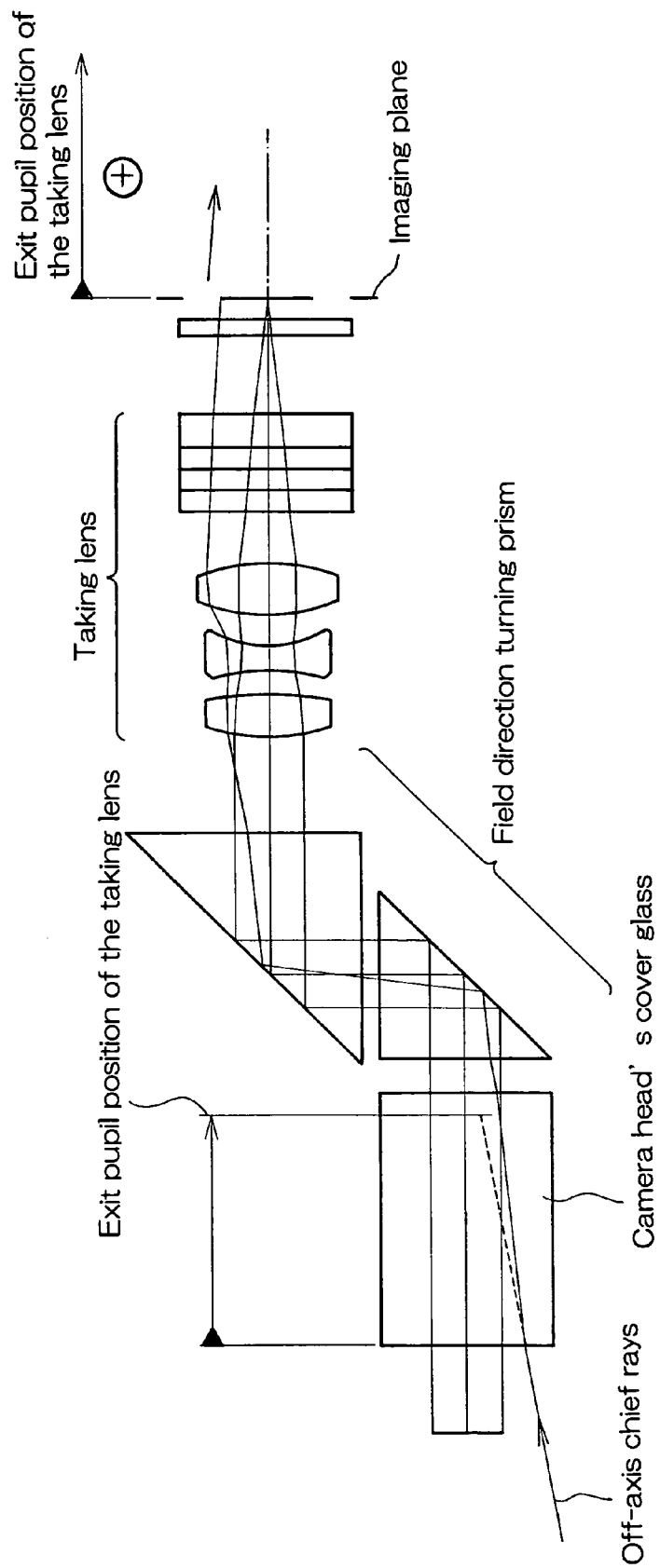
FIG. 12 is illustrative of an angle at which off-axis chief rays converge toward the imaging plane.

In the example here, the exit pupil position of the eyepiece lens indicated by EXPOC is 8 mm on the basis of the first surface S1 of the taking optical system provided that the image side is positive, and the exit pupil position of the taking lens indicated by EXPTL is −11.309 mm on the basis of the imaging plane S24 provided that the image side is positive and the object side is negative. This arrangement is well fit for the imaging device of FIG. 11(b) optimized for oblique incidence. Note here that the exit pupil diameter of the eyepiece lens is supposed to be 2.4 mm.

Figure 7:
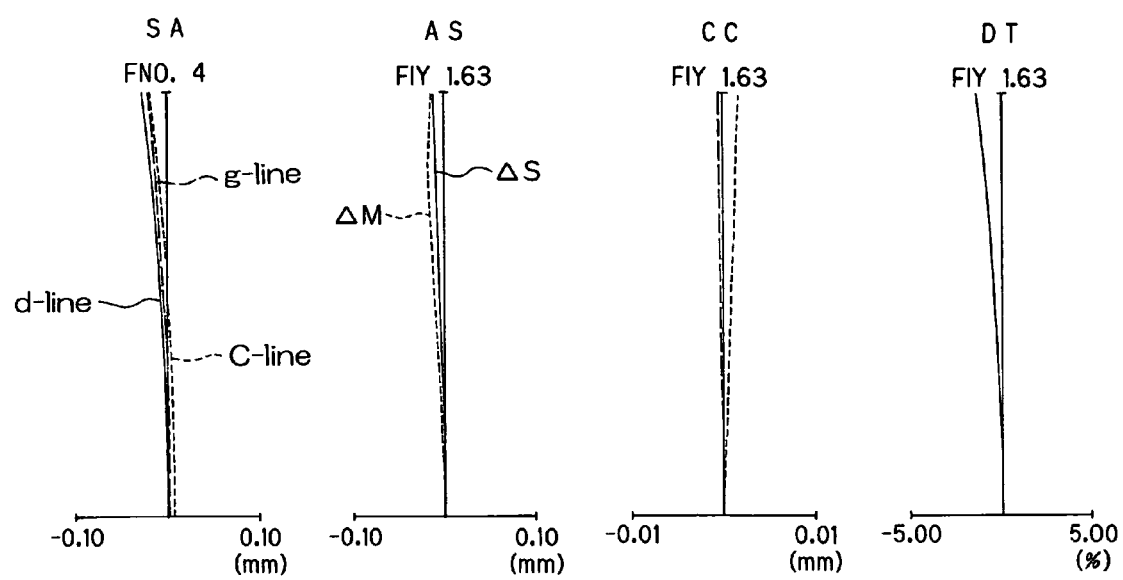
FIG. 7 is an aberration diagram for inventive Example 1.

FIG. 7 is an aberration diagram for the example here upon focusing on an object distance of 1,000 mm. Throughout the aberration diagrams for Examples 1-4, "SA", "AS", "CC" and "DT" are indicative of spherical aberrations, astigmatism, chromatic aberration of magnification and distortion, respectively, and "FIY" is indicative of an image height (mm).

Figure 3:
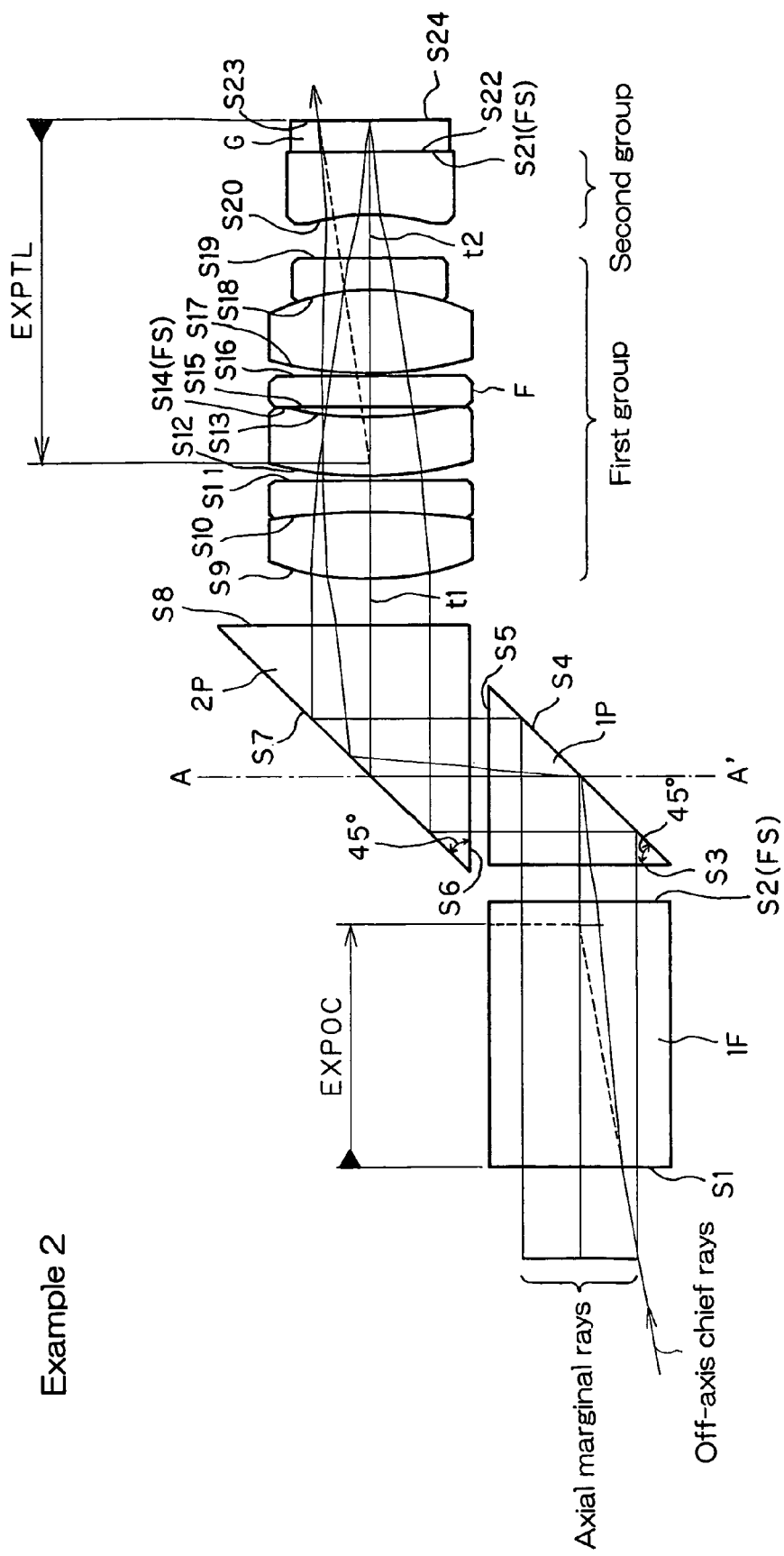
FIG. 3 is illustrative in lens arrangement section of the taking optical system of inventive Example 2.

FIG. 3 is illustrative in lens arrangement section of the taking optical system of Example 2 including its optical axis. This taking optical system (camera head) is much the same in construction, surface Nos., the turning of field direction, focus adjustment, etc. as the Example 1: its explanation is left out.

In the example here, the exit pupil position of the eyepiece lens indicated by EXPOC is 8 mm on the basis of the first surface S1 of the taking optical system provided that the image side is positive, and the exit pupil position of the taking lens indicated by EXPTL is −11.252 mm on the basis of the imaging plane S24 provided that the image side is positive and the object side is negative. This arrangement is well fit for the imaging device of FIG. 11(b) optimized for oblique incidence. Note here that the exit pupil diameter of the eyepiece lens is supposed to be 3.8 mm.

Figure 8:
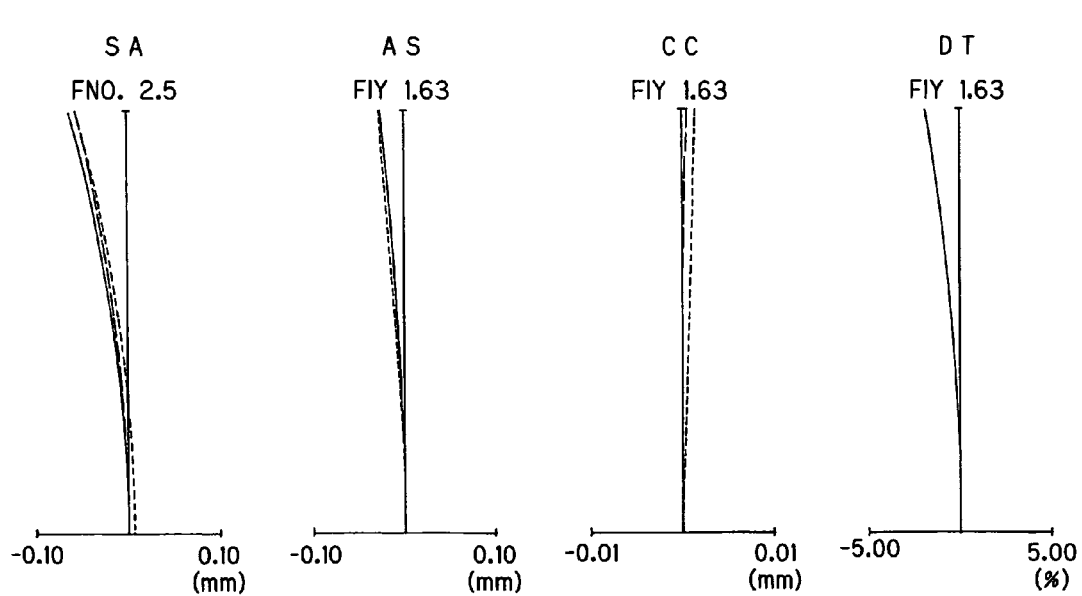
FIG. 8 is an aberration diagram for inventive Example 2.

An aberration diagram for Example 2, as in FIG. 7, is attached hereto as FIG. 8.

Figure 4:
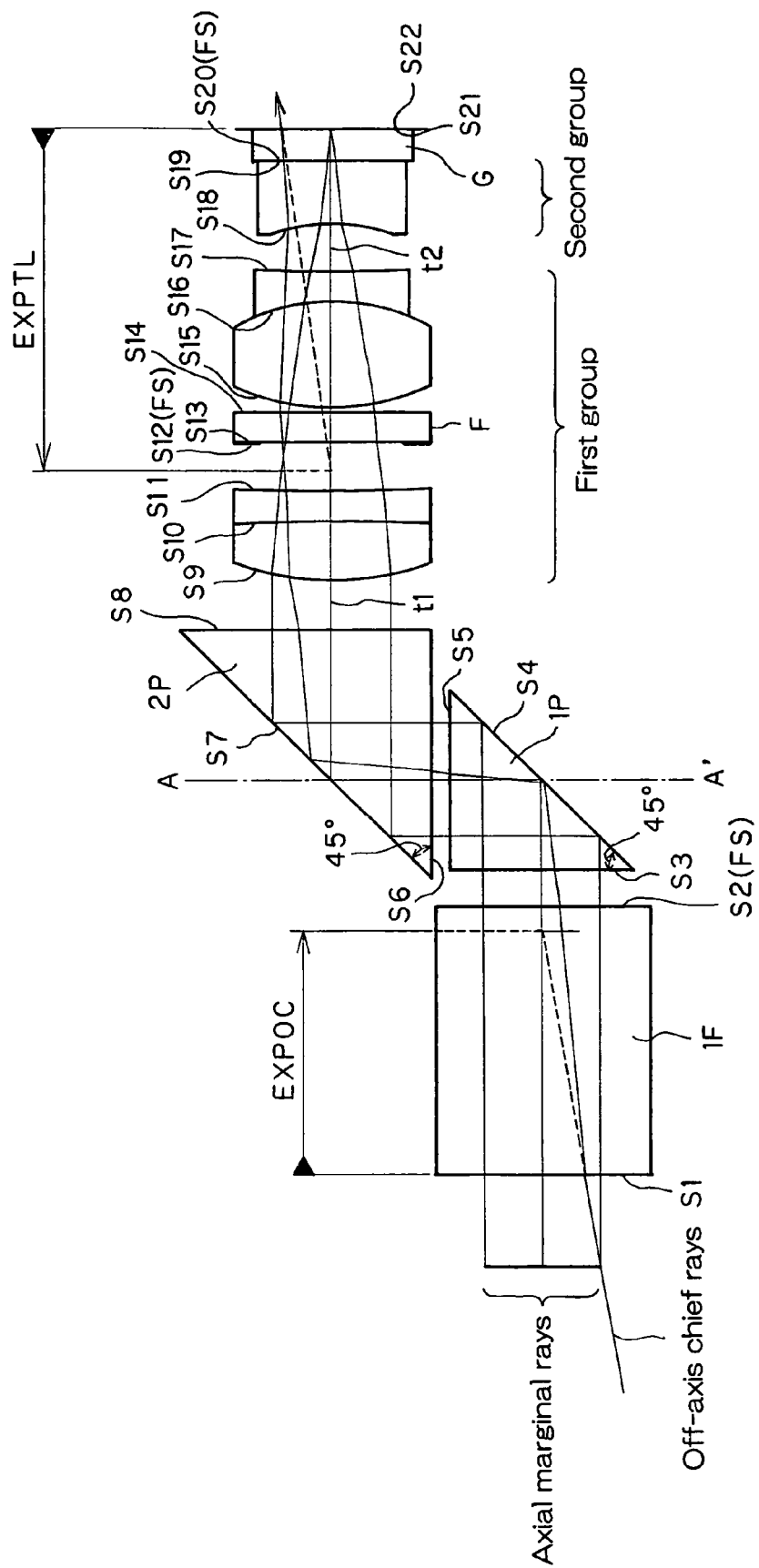
FIG. 4 is illustrative in lens arrangement section of the taking optical system of inventive Example 3.

A lens arrangement section of the taking optical system of Example 3 including its optical axis is attached hereto as FIG. 4. The taking optical system (camera head) here is built up of, in order from the eyepiece lens side of a hard endoscope 1 shown typically in FIG. 1, on which the taking optical system is mounted, the camera head's cover glass 1F indicated by surface Nos. S1 and S2, the first prism 1P that is the field direction turning prism indicated by surface Nos. S3 to S5, the second prism 2P indicated by surface Nos. S6 to S8, the first group of the taking lens indicated by surface Nos. S9 to S17, the second group indicated by surface Nos. S18 and S19, the CCD chip sealing glass G indicated by surface Nos. S20 and S21, and the imaging plane indicated by surface No. S24. The first prism 1P is made up of a right-angle prism having a reflecting surface S4 at an angle of 45° with an entrance surface S3, and the second prism 2P, too, is made up of a right-angle prism having a reflecting surface S7 at an angle of 45° with an entrance surface S6. The first group of the taking lens is made up of a positive cemented lens a double-convex positive lens indicated by surface Nos. S9 and S10 and a double-concave negative lens indicated by surface Nos. S10 and S11, the flare stop FS indicated by surface No. S12, the infrared cut filter F indicated by surface Nos. S13 and S14, and a positive cemented lens of a double-convex positive lens indicated by surface Nos. S15 and S16 and a double-concave negative lens indicated by surface Nos. S16 and S17, and the second lens group of the taking lens is made up of a concave-plano negative lens indicated by surface Nos. S18 and S19. The second lens group of the taking lens, the CCD chip sealing glass G and the imaging plane are bonded together (in the lens data given later, a vitreous material between the second group and the CCD chip sealing glass G, and a vitreous material between the CCD chip sealing glass G and the imaging plane is a bonding agent). Note here that the second surface (S2) of the camera head's cover glass 1F and the second surface (S19) of the concave-plano negative lens in the second group also serve as the flare stop FS.

To turn the field direction such that the axis of light incident from the eyepiece lens side on the taking optical system makes an angle of 90° with the axis of light incident on the imaging plane, the optical system after the second prism 2P is rotated together 90° from the shown position about an axis indicated by A-A' and lying on an optical axis from the reflecting surface S4 of the first prism 1P to the reflecting surface S7 of the second prism 2P.

The variable spacing for focus adjustment is defined by the air space t1 between the second prism 2P and the first group, and the air space t2 between the first group and the second group. As the object distance grows short, the first group is let out toward the object side while as the object distance becomes negative, the first group is conversely let out toward the image side.

In the example here, the exit pupil position of the eyepiece lens indicated by EXPOC is 8 mm on the basis of the first surface S1 of the taking optical system provided that the image side is positive, and the exit pupil position of the taking lens indicated by EXPTL is −11.237 mm on the basis of the imaging plane S22 provided that the image side is positive and the object side is negative. This arrangement is well fit for the imaging device of FIG. 11(b) optimized for oblique incidence. Note here that the exit pupil diameter of the eyepiece lens is supposed to be 3.8 mm.

Figure 9:
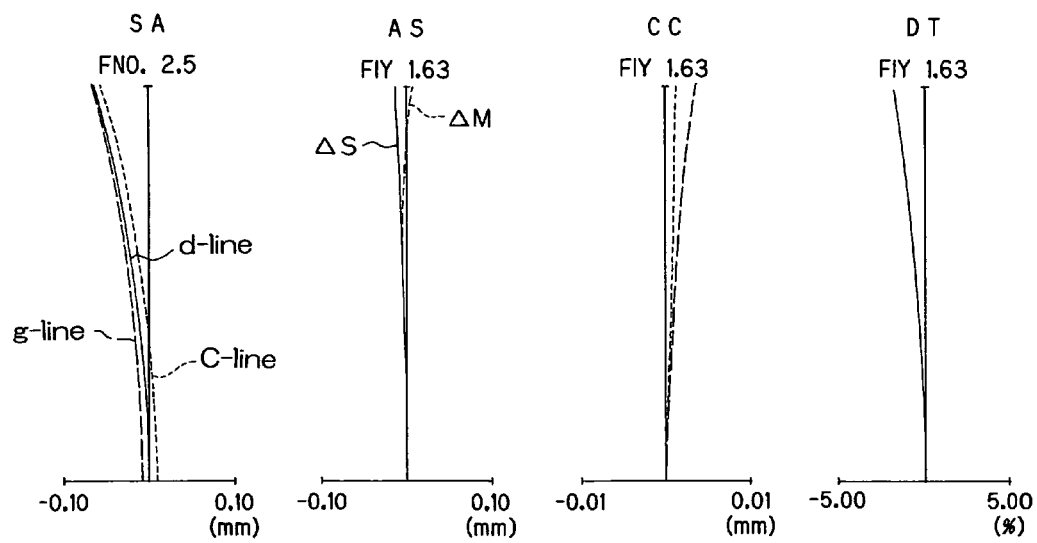
FIG. 9 is an aberration diagram for inventive Example 3.

An aberration diagram for this example, as in FIG. 7, is attached hereto as FIG. 9.

Figure 5:
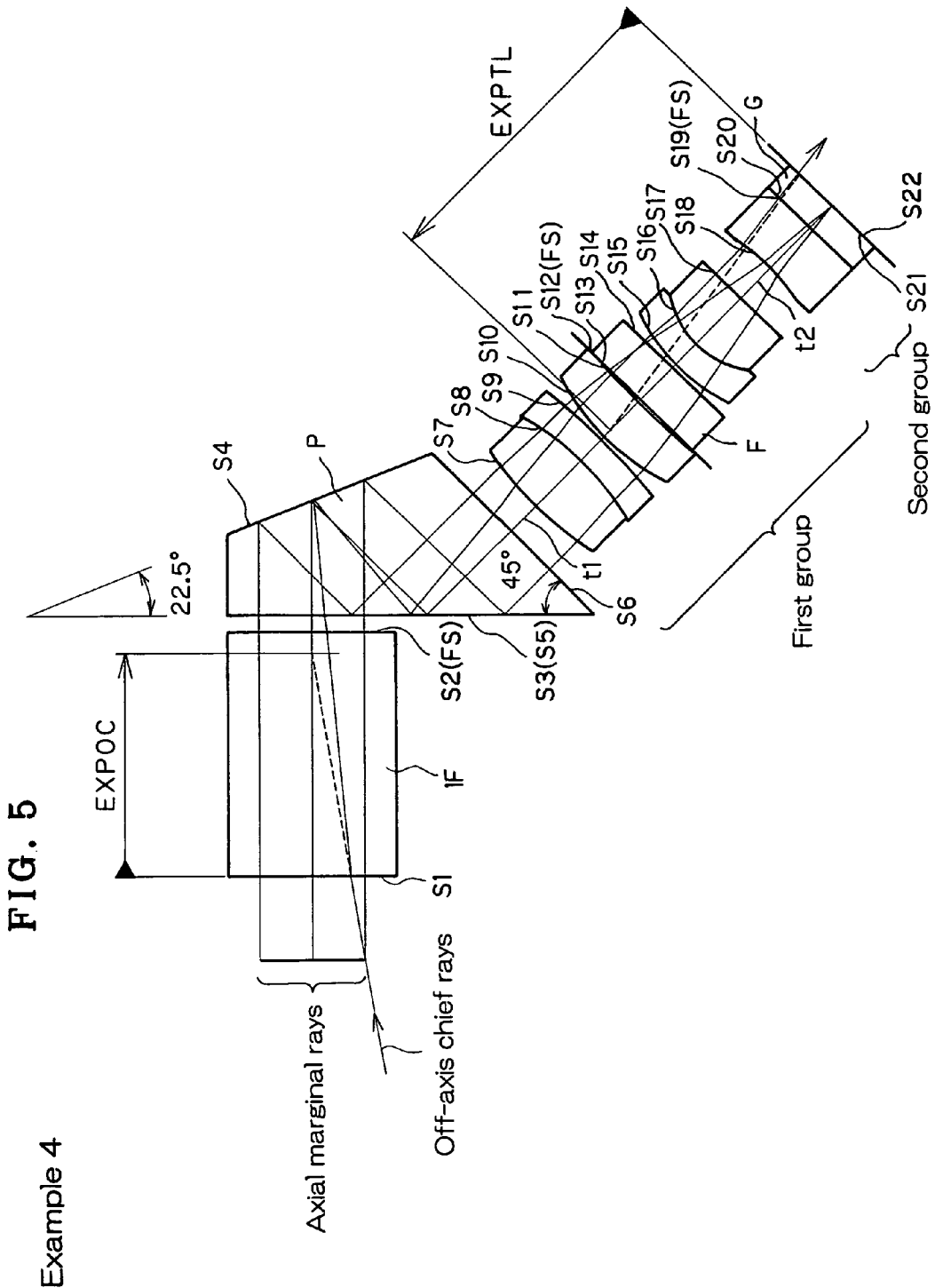
FIG. 5 is illustrative in lens arrangement section of the taking optical system of inventive Example 4.

A lens arrangement section of the taking optical system of Example 4 including its optical axis is attached hereto as FIG. 5. The taking optical system (camera head) here is built up of, in order from the eyepiece lens side of a hard endoscope 1 shown typically in FIG. 1, on which the taking optical system is mounted, the camera head's cover glass 1F indicated by surface Nos. S1 and S2, the field direction turning prism P indicated by surface Nos. S3 to S6; the first group of the taking lens indicated by surface Nos. S7 to S17, the second group indicated by surface Nos. S18 and S19, the CCD chip sealing glass G indicated by surface Nos. S20 and S21, and the imaging plane indicated by surface No. S22. The field direction turning prism P is a triangular right-angle prism comprising an entrance surface S3, a reflecting surface S4 at an angle of 22.5° with the entrance surface S3, a total reflection surface S5 that also serves as the entrance surface S3, and an exit surface S5 at an angle of 45° with the entrance surface S3. An axis of light incident from the camera head's cover glass IF on the entrance surface S3 is reflected at the reflecting surface S4 in a direction that makes an angle of 135° with that axis of light, and that axis of light is reflected at the total reflection surface S5 in a direction this time that makes an angle of 45° with the axis of light incident on the entrance surface S3, entering the first group without being refracted at the exit surface S5. The first group of the taking lens is made up of a positive cemented lens of a double-convex positive lens indicated by surface Nos. S7 and S8 and a negative meniscus lens convex on its image side and indicated by surface Nos. S8 and S9, a positive meniscus lens convex on its object side and indicated by surface Nos. S10 and S11, the flare stop FS indicated by surface No. S12, the infrared cut filter F indicated by surface Nos. S13 and S14, and a positive cemented lens of a negative meniscus lens convex on its object side and indicated by surface Nos. S15 and S16 and a double-convex positive lens indicated by surface Nos. S16 and S17, and the second lens group of the taking lens is made up of a concave-plano negative lens indicated by surface Nos. S18 and S19. The second lens group of the taking lens, the CCD chip sealing glass G and the imaging plane are bonded together (in the lens data given later, a vitreous material between the second group and the CCD chip sealing glass G, and a vitreous material between the CCD chip sealing glass G and the imaging plane is a bonding agent). Note here that the second surface (S2) of the camera head's cover glass 1F and the second surface (S19) of the concave-plano negative lens in the second group also serve as the flare stop FS.

The variable spacing for focus adjustment is defined by the air space t1 between the field direction turning prism P and the first group, and the air space t2 between the first group and the second group. As the object distance grows short, the first group is let out toward the object side while as the object distance becomes negative, the first group is conversely let out toward the image side.

In the example here, the exit pupil position of the eyepiece lens indicated by EXPOC is 8 mm on the basis of the first surface S1 of the taking optical system provided that the image side is positive, and the exit pupil position of the taking lens indicated by EXPTL is −9.195 mm on the basis of the imaging plane S22 provided that the image side is positive and the object side is negative. This arrangement is going to be well fit for the imaging device of FIG. 11(b) optimized for oblique incidence. Note here that the exit pupil diameter of the eyepiece lens is supposed to be 3.8 mm.

Figure 10:
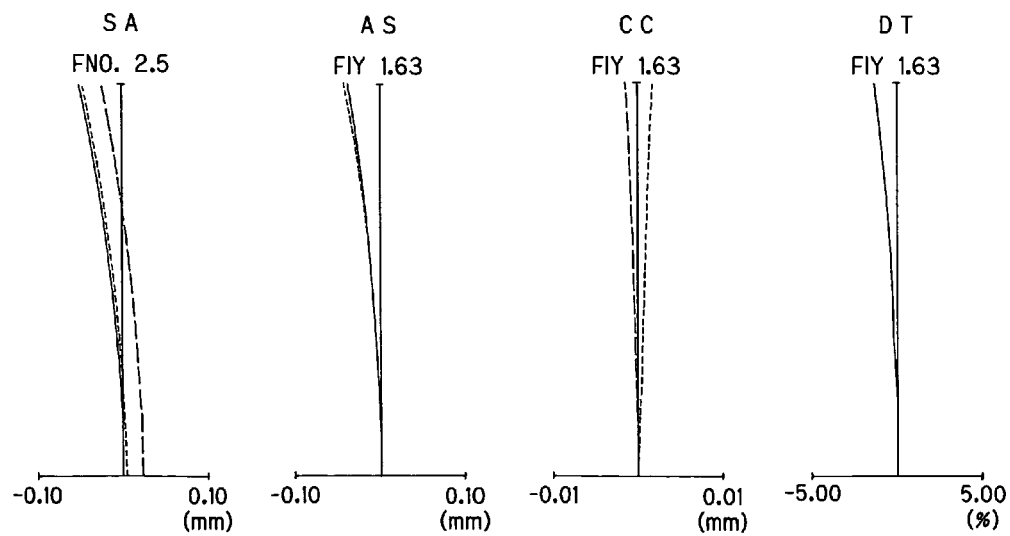
FIG. 10 is an aberration diagram for inventive Example 4.

An aberration diagram for this example, as in FIG. 7, is attached hereto as FIG. 10.

Figure 6:
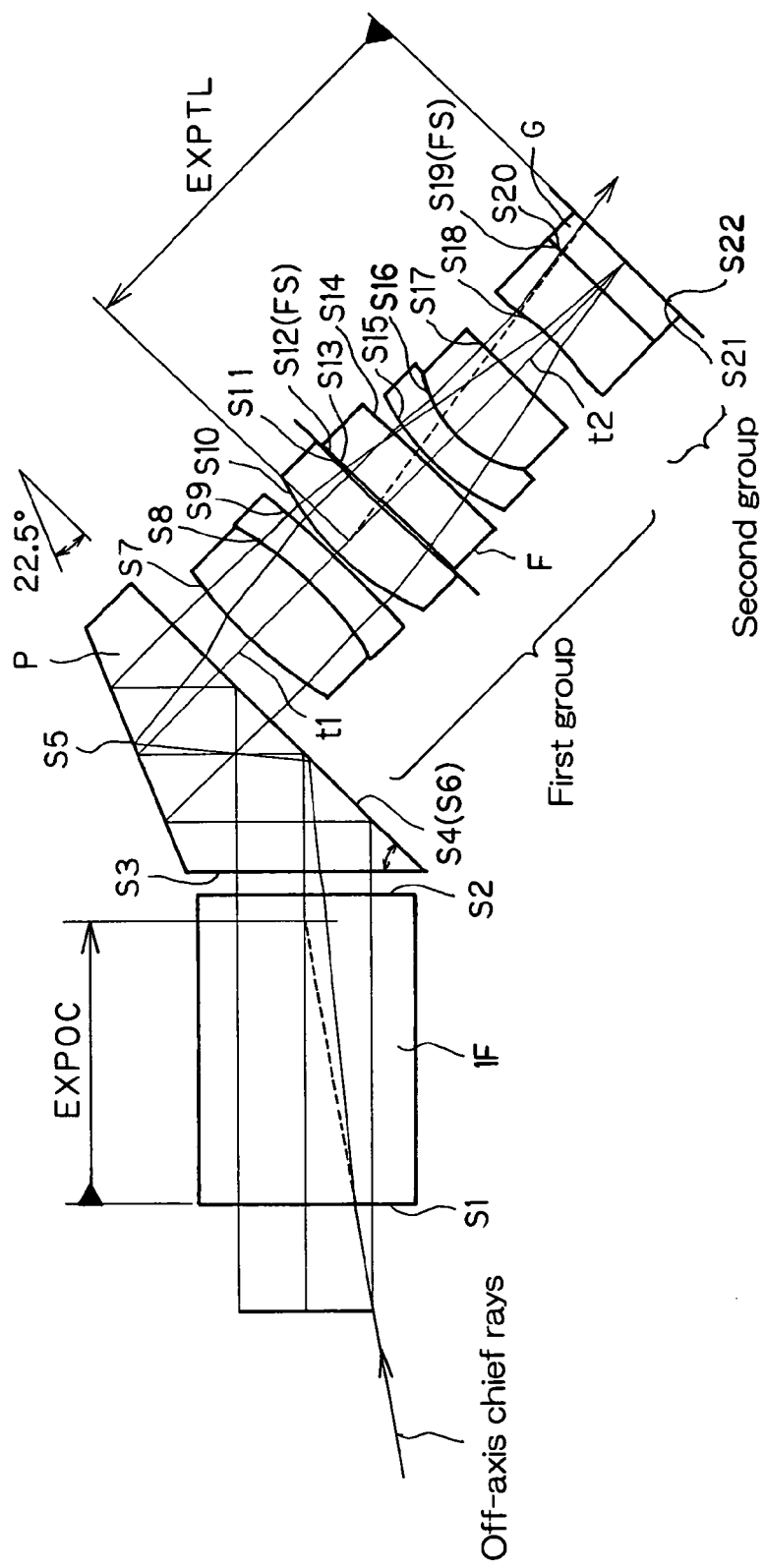
FIG. 6 is illustrative in lens arrangement section of a modification to the taking optical system of inventive Example 4.

It is appreciated that even when, in the example here, the field direction turning prism P is reversed in position as shown in FIG. 6, the axis of light incident on the imaging plane S22 may just as well be turned 45° with respect to the axis of light incident from the camera head's cover glass 1F on the entrance surface S3. More exactly, the field direction turning prism P is indicated by surface Nos. S3 to S6: it is a triangular right-angle prism having an entrance surface S3, a total reflection surface S4 that also serves as an exit surface S6 making an angle of 45° with the entrance surface S3, and a reflecting surface S5 that makes an angle of 22.5° with the total reflection surface S4. An axis of light incident from the camera head's cover glass 1F on the entrance surface S3 is reflected at the total reflection surface S4 in a direction at an angle of 90° with that axis of light, and then at the reflecting surface S5 in a direction this time that makes an angle of 45° with the axis of light incident on the entrance surface S3, entering the first group without being refracted at the exit surface S6.

Note here that other arrangements and lens data are much the same as in Example 4, and so they will be left out.

The lens data about each example are set out below, with r, d, nd, vd and BF indicative of the radius of curvature of a surface, the surface-to-surface spacing, the d-line refractive index, an Abbe constant and a back focus, respectively.

Numerical Example 1
Unit: mm

Surface Data

| Surface No. | r | d | nd | vd |
|---|---|---|---|---|
| Object Plane | ∞ | (variable) | | |
| 1 | ∞ | 8.8000 | 1.88300 | 40.76 |
| 2 | ∞ | 1.2000 | | |
| 3 | ∞ | 3.0000 | 1.80610 | 40.92 |
| 4 | ∞ | 3.0000 | 1.80610 | 40.92 |
| 5 | ∞ | 0.6000 | | |
| 6 | ∞ | 3.2000 | 1.80610 | 40.92 |
| 7 | ∞ | 5.0000 | 1.80610 | 40.92 |
| 8 | ∞ | (variable) | | |
| 9 | 9.5350 | 2.3000 | 1.72916 | 54.68 |
| 10 | −16.8690 | 1.0000 | 1.84666 | 23.78 |
| 11 | ∞ | 0.1500 | | |
| 12 | 10.5460 | 1.6000 | 1.88300 | 40.76 |
| 13 | 18.4600 | 0.2000 | | |
| 14 | ∞ | 0.0300 | | |
| 15 | ∞ | 1.0000 | 1.49400 | 75.00 |
| 16 | ∞ | 0.1500 | | |
| 17 | 24.2420 | 2.5000 | 1.77250 | 49.60 |
| 18 | −8.7540 | 1.0000 | 1.84666 | 23.78 |
| 19 | ∞ | (variable) | | |
| 20 | −4.5540 | 1.4000 | 1.51633 | 64.14 |
| 21 | ∞ | 0.0300 | 1.51000 | 64.10 |
| 22 | ∞ | 1.0000 | 1.61062 | 50.50 |
| 23 | ∞ | 0.0100 | 1.52000 | 64.10 |
| Image Plane | ∞ | | | |

Various Data

| | |
|---|---|
| Focal Length: | 9.545 |
| F-Number: | 4 |
| Half Angle of View (°): | 9.7 |
| Image Height: | 1.63 |
| Total Lens Length: | 40.63 (Note) |
| BF: | 0.65 |

Focus Adjustment Spacing

| Surface No. | | | |
|---|---|---|---|
| Object Plane | 1000.00000 | 166.00000 | −500.00000 |
| 8 | 1.68000 | 1.36358 | 1.88201 |
| 19 | 1.78000 | 2.09642 | 1.57799 |

Numerical Example 2
Unit: mm

Surface Data

| Surface No. | r | d | nd | vd |
|---|---|---|---|---|
| Object Plane | ∞ | (variable) | | |
| 1 | ∞ | 8.8000 | 1.88300 | 40.76 |
| 2 | ∞ | 1.2000 | | |
| 3 | ∞ | 3.0000 | 1.80610 | 40.92 |
| 4 | ∞ | 3.0000 | 1.80610 | 40.92 |
| 5 | ∞ | 0.6000 | | |
| 6 | ∞ | 3.2000 | 1.80610 | 40.92 |
| 7 | ∞ | 5.0000 | 1.80610 | 40.92 |
| 8 | ∞ | (variable) | | |
| 9 | 10.2370 | 2.2000 | 1.72916 | 54.68 |
| 10 | −22.2370 | 1.0000 | 1.84666 | 23.78 |
| 11 | ∞ | 0.1500 | | |
| 12 | 11.2800 | 2.0000 | 1.88300 | 40.76 |
| 13 | 15.1360 | 0.2400 | | |
| 14 | ∞ | 0.0300 | | |
| 15 | ∞ | 1.0000 | 1.49400 | 75.00 |
| 16 | ∞ | 0.1500 | | |
| 17 | 12.3610 | 2.7000 | 1.77250 | 49.60 |
| 18 | −7.3590 | 1.0000 | 1.84666 | 23.78 |
| 19 | ∞ | (variable) | | |
| 20 | −6.9630 | 2.0000 | 1.88300 | 40.76 |
| 21 | ∞ | 0.0300 | 1.51000 | 64.10 |
| 22 | ∞ | 1.0000 | 1.61062 | 50.50 |
| 23 | ∞ | 0.0100 | 1.52000 | 64.10 |
| Image plane | ∞ | | | |

Various Data

| | |
|---|---|
| Focal Length: | 9.527 |
| F-Number: | 2.5 |
| Half Angle of View (°): | 9.8 |
| Image Height: | 1.63 |
| Total Lens Length: | 41.35 (Note) |
| BF: | 0.65 |

Focus Adjustment Spacing

| Surface No. | | | |
|---|---|---|---|
| Object Plane | 1000.00000 | 166.00000 | −500.00000 |
| 8 | 1.59000 | 1.29507 | 1.77934 |
| 19 | 1.45000 | 1.74493 | 1.26066 |

Numerical Example 3
Unit: mm

Surface Data

| Surface No. | r | d | nd | vd |
|---|---|---|---|---|
| Object Plane | ∞ | (variable) | | |
| 1 | ∞ | 8.8000 | 1.88300 | 40.76 |
| 2 | ∞ | 1.2000 | | |
| 3 | ∞ | 3.0000 | 1.80610 | 40.92 |
| 4 | ∞ | 3.0000 | 1.80610 | 40.92 |
| 5 | ∞ | 0.6000 | | |
| 6 | ∞ | 3.2000 | 1.80610 | 40.92 |
| 7 | ∞ | 5.0000 | 1.80610 | 40.92 |
| 8 | ∞ | (variable) | | |
| 9 | 9.0559 | 1.9552 | 1.72916 | 54.68 |
| 10 | −65.9647 | 1.0000 | 1.84666 | 23.78 |
| 11 | 67.8415 | 1.5390 | | |
| 12 | ∞ | 0.0300 | | |
| 13 | ∞ | 1.0000 | 1.49400 | 75.00 |
| 14 | ∞ | 0.1500 | | |
| 15 | 7.8606 | 3.4204 | 1.77250 | 49.60 |
| 16 | −6.6418 | 1.0000 | 1.84666 | 23.78 |
| 17 | 89.4707 | (variable) | | |
| 18 | −6.2884 | 2.0000 | 1.88300 | 40.76 |
| 19 | ∞ | 0.0300 | 1.51000 | 64.10 |
| 20 | ∞ | 1.0000 | 1.61062 | 50.50 |
| 21 | ∞ | 0.0100 | 1.52000 | 64.10 |
| Image Plane | ∞ | | | |

Various Data

| | |
|---|---|
| Focal Length: | 9.54 |
| F-Number: | 2.5 |
| Half Angle of View (°): | 9.8 |
| Image Height: | 1.63 |
| Total Lens Length: | 41.04 (Note) |
| BF: | 0.65 |

Focus Adjustment Spacing

| Surface No. | | | |
|---|---|---|---|
| Object Plane | 1000.00000 | 166.00000 | −500.00000 |
| 8 | 1.58058 | 1.29794 | 1.76319 |
| 17 | 1.52028 | 1.80292 | 1.33767 |

Numerical Example 4
Unit: mm

Surface Data

| Surface No. | r | d | nd | vd |
|---|---|---|---|---|
| Object Plane | ∞ | (variable) | | |
| 1 | ∞ | 8.8000 | 1.88300 | 40.76 |
| 2 | ∞ | 0.6000 | | |
| 3 | ∞ | 4.1182 | 1.80610 | 40.92 |
| 4 | ∞ | 5.8240 | 1.80610 | 40.92 |
| 5 | ∞ | 4.2000 | 1.80610 | 40.92 |
| 6 | ∞ | (variable) | | |
| 7 | 12.4380 | 2.3374 | 1.48749 | 70.23 |
| 8 | −9.3097 | 1.0000 | 1.84666 | 23.78 |
| 9 | −26.4386 | 0.1500 | | |
| 10 | 8.8271 | 1.7608 | 1.88300 | 40.76 |
| 11 | 61.0949 | 0.0800 | | |
| 12 | ∞ | 0.0300 | | |
| 13 | ∞ | 1.6000 | 1.51400 | 74.00 |
| 14 | ∞ | 0.1500 | | |
| 15 | 7.6343 | 1.0197 | 1.88300 | 40.76 |
| 16 | 3.4606 | 2.3058 | 1.48749 | 70.23 |
| 17 | −448.4619 | (variable) | | |
| 18 | −6.6428 | 2.0000 | 1.88300 | 40.76 |
| 19 | ∞ | 0.0300 | 1.51000 | 64.10 |
| 20 | ∞ | 1.0000 | 1.61062 | 50.50 |
| 21 | ∞ | 0.0100 | 1.52000 | 64.10 |
| Image Plane | ∞ | | | |

Various Data

| | |
|---|---|
| Focal Length: | 9.526 |
| F-Number: | 2.5 |
| Half Angle of View (°): | 9.7 |
| Image Height: | 1.63 |
| Total Lens Length: | 39.77 (Note) |
| BF: | 0.65 |

Focus Adjustment Spacing

| Surface No. | | | | |
|---|---|---|---|---|
| Object Plane | 1000.00000 | 166.00000 | −500.00000 | |
| 6 | 1.24452 | 0.93968 | 1.42927 | |
| 17 | 1.50841 | 1.81326 | 1.32366 | |

Note:
Length from the first surface to the imaging plane

The values of conditions (1), (2), (3) and (4) and the values of the elements in them are tabulated below.

| Condition | Ex. 1 | Ex. 2 | Ex. 3 | Ex. 4 |
|---|---|---|---|---|
| (1) L/f | 1.69 | 1.69 | 1.68 | 1.71 |
| (2) f1/f2 | −0.93 | −1.00 | −1.09 | −1.04 |
| (3) β2 | 1.18 | 1.22 | 1.24 | 1.23 |
| (4) f1F/f1R | 0.34 | 0.80 | 1.20 | 0.29 |
| L | 16.133 | 16.058 | 16.071 | 16.314 |
| f | 9.545 | 9.527 | 9.54 | 9.526 |
| f1 | 8.168 | 7.905 | 7.76 | 7.839 |
| f2 | −8.82 | −7.886 | −7.122 | −7.523 |
| f1F | 14.242 | 15.055 | 14.687 | 30.313 |
| f1R | 42.061 | 18.735 | 12.193 | 104.877 |

The inventive zoom optical system may further be embodied as recited below.

Embodiment 1

An eyepiece-connected taking optical system, which comprises, in order from its object side, a field direction turning member, a positive first group and a negative second group, characterized in that said first group comprises a positive cemented lens convex on its object side, a positive single lens convex on its object side and a positive cemented lens convex on its object side, said second lens group comprises a negative single lens and is joined to an imaging device, and focus adjustment is implemented by changing the spacing between said first group and said second group, with the satisfaction of the following conditions (1), (2), (3) and (4):

$$1.4 < L/f < 2 \tag{1}$$

$$-1.3 < f_1/f_2 < -0.7 \tag{2}$$

$$1.05 < \beta_2 < 1.4 \tag{3}$$

$$0.2 < f_{1F}/f_{1R} < 1.6 \tag{4}$$

where L is the absolute value of the distance of the first group from the lens surface nearest to the object side to the front focus, f is the focal length of the whole taking optical system, $f_1$ is the focal length of the first group, $f_2$ is the focal length of the second group, $\beta_2$ is the imaging magnification of the second group, $f_{1F}$ is the focal length of the lens located in the first group and nearest to the object side, and $f_{1R}$ is the focal length of the lens located in the first group and nearest to the image side.

Embodiment 2

An eyepiece-connected taking optical system, which comprises, in order from its object side, a field direction turning member, a positive first group and a negative second group, characterized in that said first group comprises a first positive cemented lens convex on its object side and a second positive lens convex on its object side, said second lens group comprises a negative single lens and is joined to an imaging device, and focus adjustment is implemented by changing the spacing between said first group and said second group, with the satisfaction of the following conditions (1), (2), (3) and (4):

$$1.4 < L/f < 2 \tag{1}$$

$$-1.3 < f_1/f_2 < -0.7 \tag{2}$$

$$1.05 < \beta_2 < 1.4 \tag{3}$$

$$0.2 < f_{1F}/f_{1R} < 1.6 \tag{4}$$

where L is the absolute value of the distance of the first group from the lens surface nearest to the object side to the front focus, f is the focal length of the whole taking optical system, $f_1$ is the focal length of the first group, $f_2$ is the focal length of the second group, $\beta_2$ is the imaging magnification of the second group, $f_{1F}$ is the focal length of the lens located in the first group and nearest to the object side, and $f_{1R}$ is the focal length of the lens located in the first group and nearest to the image side.

I claim:

1. A taking optical system comprising, in order from its object side, a positive first group and a negative second group, characterized in that focus adjustment is implemented by changing a spacing between the first group and the second group, with satisfaction of the following condition (1):

$$1.4 < L/f < 2 \tag{1}$$

where L is a distance from the most object side surface of the first group to a front focal point, and f is a focal length of the whole taking optical system.

2. The taking optical system according to claim 1, characterized in that said second lens group includes a negative single lens, and the negative single lens in said second group is joined to an imaging device, and during assembling, said first group and said second group are adjusted for decentration.

3. The taking optical system according to claim 1, characterized by satisfaction of the following conditions (2), (3) and (4):

$$-1.3 < f_1/f_2 < -0.7 \tag{2}$$

$$1.05 < \beta_2 < 1.4 \tag{3}$$

$$0.2 < f_{1F}/f_{1R} < 1.6 \tag{4}$$

where $f_1$ is a focal length of the first group,
 $f_2$ is a focal length of the second group,
 $\beta_2$ is an imaging magnification of the second group,
 $f_{1F}$ is a focal length of the lens located in the first group and nearest to the object side, and
 $f_{1R}$ is a focal length of the lens located in the first group and nearest to an image side.

4. The taking optical system according to claim 3, characterized in that said second lens group includes a negative single lens, and the negative single lens in said second group is joined to an imaging device, and during assembling, said first group and said second group are adjusted for decentration.

* * * * *